US012793481B2

(12) United States Patent
Gordon et al.

(10) Patent No.: US 12,793,481 B2
(45) Date of Patent: Nov. 10, 2026

(54) BEHAVIORAL PROFILES FOR VEHICLE DRIVERS

(71) Applicant: GM GLOBAL TECHNOLOGY OPERATIONS LLC, Detroit, MI (US)

(72) Inventors: Richard Gordon, Canton, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/798,195

(22) Filed: Aug. 8, 2024

(65) Prior Publication Data

US 2026/0045126 A1 Feb. 12, 2026

(51) Int. Cl.
*G07C 5/08* (2006.01)

(52) U.S. Cl.
CPC .................................... *G07C 5/085* (2013.01)

(58) Field of Classification Search
CPC ...................................................... G07C 5/085
USPC ........................................................ 701/32.1
See application file for complete search history.

(56) References Cited

U.S. PATENT DOCUMENTS 11,862,013 B2 1/2024 Grimm et al.
2021/0012590 A1* 1/2021 Lawrie-Fussey .... G07C 5/0816
2021/0070308 A1 3/2021 Kim
2024/0012590 A1 1/2024 Yamamoto
2024/0140481 A1 5/2024 Kaste et al.
2024/0294174 A1 9/2024 Gordon et al.

OTHER PUBLICATIONS

German Office Action for German Application No. 102024128646.6; dated Feb. 18, 2025; 7 pages.

* cited by examiner

*Primary Examiner* — Maceeh Anwari
(74) *Attorney, Agent, or Firm* — CANTOR COLBURN LLP

(57) ABSTRACT

A system for evaluating a vehicle includes a monitoring module configured to acquire information related to a combined force applied to the vehicle, and an analysis module configured to receive the acquired information and determine a plurality of force pairs based on the acquired information, each force pair of the plurality of force pairs including a longitudinal force value and a lateral force value. The analysis module is configured to assign each force pair to one of a plurality of bins, and construct a two-dimensional behavioral profile that spatially represents the combined forces and presents a pattern of behavior during the time window, the behavioral profile including a two-dimensional array of data elements, each data element of the array of data elements corresponding to a respective bin, where the behavioral profile is constructed by populating each data element based on one or more force pairs assigned to the respective bin.

20 Claims, 11 Drawing Sheets

BEHAVIORAL PROFILES FOR VEHICLE DRIVERS

INTRODUCTION

The subject disclosure relates to the art of vehicle monitoring, planning and control. More particularly, the subject disclosure relates to systems and methods for summarizing and presenting behavioral information related to operation of a vehicle.

Vehicles are increasingly equipped with sensors and perception devices that improve the awareness of vehicle control systems and drivers, and can provide for autonomous control and/or driver support. Data from such systems can be used to monitor vehicle usage and collect information that can be used to enhance driver experiences, and provide insights into vehicle performance and need for repairs and maintenance. It is desirable to provide systems and methods that can provide further insights.

SUMMARY

In one exemplary embodiment, a system for evaluating a vehicle includes a monitoring module configured to acquire information related to a combined force applied to the vehicle at each of a plurality of successive sample times during a selected time window, the combined force applied to the vehicle based on driver control of the vehicle, the combined force including a longitudinal force and a lateral force. The system also includes an analysis module configured to receive the acquired information and determine a plurality of force pairs based on the acquired information, each force pair of the plurality of force pairs including a longitudinal force value and a lateral force value. The analysis module is configured to assign each force pair to one of a plurality of bins, each bin of the plurality of bins associated with a respective longitudinal force range and a respective lateral force range, and construct a two-dimensional behavioral profile that spatially represents the combined forces and presents a pattern of behavior during the selected time window, the two-dimensional behavioral profile including a two-dimensional array of data elements, each data element of the two-dimensional array of data elements corresponding to a respective bin, where the two-dimensional behavioral profile is constructed by populating each data element based on one or more force pairs assigned to the respective bin.

In addition to one or more of the features described herein, the system includes a control module configured to perform at least one of controlling an aspect of vehicle operation based on the two-dimensional behavioral profile, presenting a suggestion to a driver of the vehicle based on the two-dimensional behavioral profile, determining a driving style of the driver based on the two-dimensional behavioral profile acceleration, and evaluating a condition of the vehicle based on the two-dimensional behavioral profile.

In addition to one or more of the features described herein, the monitoring module is configured to collect, for each sample time window, a vehicle position, a vehicle heading, a longitudinal acceleration and a lateral acceleration of the vehicle.

In addition to one or more of the features described herein, at least one of the longitudinal acceleration and the lateral acceleration is determined based on the vehicle position, a vehicle velocity and a trajectory of the vehicle.

In addition to one or more of the features described herein, the two-dimensional array of data elements is a two-dimensional grid having a first axis representing longitudinal force values and a second axis representing lateral force values, and the two-dimensional grid includes a plurality of cells and is divided into a set of quadrants.

In addition to one or more of the features described herein, the set of quadrants include an upper left quadrant representing forward acceleration and leftward acceleration, an upper right quadrant representing forward acceleration and rightward acceleration, a lower left quadrant representing longitudinal deceleration and leftward acceleration, and a lower right quadrant representing longitudinal deceleration and rightward acceleration.

In addition to one or more of the features described herein, each bin is a feature vector, and the analysis module is configured to, for each force pair, determine a combined force vector based on the longitudinal force value and the lateral force value, and assign the combined force vector to the respective bin.

In addition to one or more of the features described herein, a data element is populated with a value based on a bin count for an associated bin, the bin count representing a number of force pairs assigned to the associated bin.

In addition to one or more of the features described herein, the data element is populated by a probability value, the probability value based on the bin count for the associated bin and a total bin count, the total bin count being a sum of bin counts in the two-dimensional array of data elements.

In another exemplary embodiment, a method of evaluating a vehicle includes acquiring information related to a combined force applied to the vehicle at each of a plurality of successive sample times during a selected time window, the combined force applied to the vehicle based on driver control of the vehicle, the combined force including a longitudinal force and a lateral force. The method includes determining a plurality of force pairs based on the acquired information, each force pair of the plurality of force pairs including a longitudinal force value and a lateral force value, and assigning each force pair to one of a plurality of bins, each bin of the plurality of bins associated with a respective longitudinal force range and lateral force range. The method also includes constructing a two-dimensional behavioral profile that spatially represents the combined forces and presents a pattern of driver behavior during the selected time window, the two-dimensional behavioral profile including a two-dimensional array of data elements, each data element of the two-dimensional array of data elements corresponding to a respective bin, where the two-dimensional behavioral profile is constructed by populating each data element based on one or more force pairs assigned to the respective bin.

In addition to one or more of the features described herein, acquiring the information includes collecting, for each sample time window, a vehicle position, a vehicle heading, a longitudinal acceleration and a lateral acceleration of the vehicle.

In addition to one or more of the features described herein, at least one of the longitudinal acceleration and the lateral acceleration is determined based on the vehicle position, a vehicle velocity and a trajectory of the vehicle.

In addition to one or more of the features described herein, the two-dimensional array of data elements is a two-dimensional grid having a first axis representing longitudinal force values and a second axis representing lateral force values, and the two-dimensional grid includes a plurality of cells and is divided into a set of quadrants.

In addition to one or more of the features described herein, each bin is a feature vector, and assigning a force pair includes determining a combined force vector based on a longitudinal force value and a lateral force value, and assigning the combined force vector to the respective bin.

In addition to one or more of the features described herein, a data element is populated with a value corresponding to a bin count for an associated bin, the bin count representing a number of force pairs assigned to the associated bin, and constructing the two-dimensional behavioral profile includes excluding cells in a center region of the grid to generate a final behavioral profile.

In yet another exemplary embodiment, a vehicle system includes a memory having computer readable instructions, and a processing device for executing the computer readable instructions, the computer readable instructions controlling the processing device to perform a method. The method includes acquiring information related to a combined force applied to a vehicle at each of a plurality of successive sample times during a selected time window, the combined force applied to the vehicle based on driver control of the vehicle, the combined force including a longitudinal force and a lateral force. The method includes determining a plurality of force pairs based on the acquired information, each force pair of the plurality of force pairs including a longitudinal force value and a lateral force value, and assigning each force pair to one of a plurality of bins, each bin of the plurality of bins associated with a respective longitudinal force range and lateral force range. The method also includes constructing a two-dimensional behavioral profile that spatially represents the combined forces and presents a pattern of driver behavior during the selected time window, the two-dimensional behavioral profile including a two-dimensional array of data elements, each data element of the two-dimensional array of data elements corresponding to a respective bin, where the two-dimensional behavioral profile is constructed by populating each data element based on one or more force pairs assigned to the respective bin.

In addition to one or more of the features described herein, acquiring the information includes collecting, for each sample time window, a vehicle position, a vehicle heading, a longitudinal acceleration and a lateral acceleration of the vehicle.

In addition to one or more of the features described herein, at least one of the longitudinal acceleration and the lateral acceleration is determined based on the vehicle position, a vehicle velocity and a trajectory of the vehicle.

In addition to one or more of the features described herein, each bin is a feature vector, and assigning a force pair includes determining a combined force vector based on a longitudinal force value and a lateral force value, and assigning the combined force vector to a bin.

In addition to one or more of the features described herein, a data element is populated with a value corresponding to a bin count for an associated bin, the bin count representing a number of force pairs assigned to the associated bin, and constructing the two-dimensional behavioral profile includes excluding a set of data elements in a center region of the two-dimensional array to generate a final behavioral profile.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
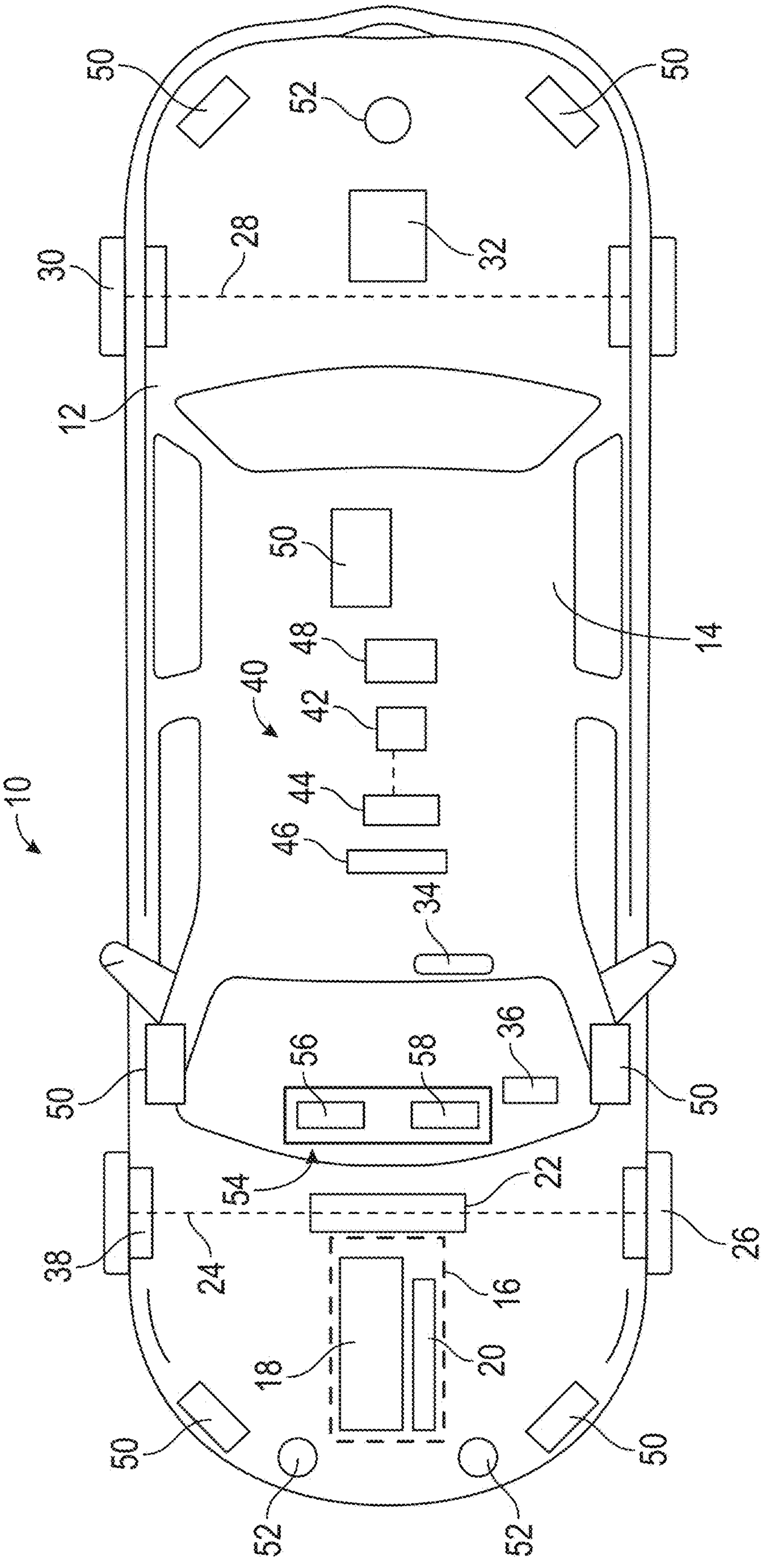
FIG. 1 is a top view of a motor vehicle including aspects of a user interaction and prediction system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods and systems are provided for evaluating and characterizing vehicle and driver behavior during vehicle operation. An embodiment of a monitoring and evaluation system (referred to as a "monitoring system") is configured to monitor a vehicle and generate a two-dimensional profile or data pattern representing vehicle behavior. The profile or data pattern is referred to herein as a "behavioral profile," and may be related to a specific vehicle or group of vehicles, a specific driver or group of drivers and/or a given situation or condition.

An embodiment of a behavioral profile includes a two-dimensional (2D) data structure, such as a 2D grid, which includes an array of data elements. Each element may be populated with a combined force value (or value related to a number of sampled combined force values, such as a count number or probability value) that includes a combination of measured or estimated longitudinal and lateral forces at a given measurement time or time window. For example, the behavioral profile is a 2D graph that defines a longitudinal force axis and a lateral force axis. The graph may be constructed using a binning technique, in which lateral and longitudinal force pairs are assigned to respective bins. The behavioral profile may be generated by assigning a value to each cell of the graph based on force data collected for an associated bin. For example, each cell may be populated with a bin count, or a probability value.

Embodiments described herein present a number of advantages. For example, the embodiments provide for intuitive spatial representations of driver behavior in a given context, which can be used to provide insights into driver behavior and related effects. Such insights can be used in a variety of manners, such as providing suggestions to a driver to improve driver experience and performance, evaluating vehicle wear, assessing intersections and other routes, and others. By accounting jointly for both longitudinal and lateral accelerations, embodiments can reveal patterns that do not arise due to other approaches.

When driving, a vehicle experiences various stresses, which are not exclusively longitudinal or lateral, but are instead somewhere in between. The behavioral profiles described herein provide a joint distribution of lateral and longitudinal forces, which overcomes issues in existing methods.

For example, existing joint probability approaches (e.g., methods that separately bin applied acceleration and steering forces and using expected joint probability methods), can misrepresent actual applied forces experienced by a vehicle. Collecting headway and lateral acceleration metrics separately hides the applied forces and inertia experienced by the vehicle, driver, and cabin contents. Embodiments address such limitations.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion systems 16 and other vehicle components, such as a braking subsystem, a suspension system, a steering subsystem, and if the vehicle is a hybrid electric vehicle, a fuel injection subsystem, an exhaust subsystem and others.

The vehicle 10 may be a combustion engine vehicle, an electrically powered vehicle (EV) or a hybrid vehicle. In an embodiment, the vehicle 10 is a hybrid vehicle that includes a combustion engine system 18 and at least one electric motor assembly. In an embodiment, the propulsion system 16 includes an electric motor 20, and may include one or more additional motors positioned at various locations. The vehicle 10 may be a fully electric vehicle having one or more electric motors.

The propulsion system 16 includes additional components for support of propulsion, such as a cooling system and a transmission system 22 for controlling the transfer of torque from the engine 18 and/or motor 20 to a front drive shaft or front axle 24. The front axle 24 is connected to front wheels 26.

The propulsion system 16 is not limited to the specific configuration shown. For example, the propulsion system 16 can include additional components, such as a transmission system for transferring torque to a rear drive shaft or rear axle 28 connected to rear wheels 30. As previously noted, the propulsion system may include additional torque generation devices, such as a rear electric motor 32. The vehicle may include various control devices for controlling aspects of vehicle operation, such as a steering wheel 34, an acceleration pedal 36, and brakes 38.

The vehicle 10 includes various sensors and measurement systems, which may be used in conjunction with a vehicle monitoring system 40 for supporting vehicle operation. The system 40 includes a monitoring module 42 configured to collect data (e.g., force measurements, position and velocity information, etc.) relating to forces on the vehicle 10. A processing module 44 receives the measurement data and constructs or generates a two-dimensional behavioral profile as discussed further herein. The processing module 44 includes or is connected to an interface module 46 for presenting information to a driver or other user (e.g., display behavioral profile and/or suggestions) or otherwise communicating information to a user.

The various sensors may detect forces on the vehicle 10, including forces applied to the vehicle 10 via driver control (e.g., steering, accelerating, braking), as well as inertial forces. For example, an inertial measurement unit (IMU) 48 is included for measuring vehicle parameters such as heading, speed, acceleration, turn rate, inclination and others.

Other sensors may be included for monitoring control devices, such as wheel speed sensors connected to one or more of the wheels 26 and 30, a steering sensor connected to the steering wheel 34, brake sensors and others. The other sensors may also include a global positioning system (GPS) unit for location and/or a Doppler GPS unit for velocity relative to global coordinates.

The sensors, in an embodiment, include a perception system for detecting and monitoring the environment around the vehicle. The perception system includes, for example, one or more optical cameras 50 that are configured to take images, which may be still images and/or video images. Additional devices or sensors may be included in the vehicle 10, such as one or more radar assemblies 52. The perception system is not so limited and may include other types of sensors, such as lidar and infrared sensors.

The monitoring system 40 may communicate or operate in conjunction with a vehicle control system for autonomous control or semi-autonomous control (e.g., driver assistance) of the vehicle 10. The vehicle control system may control aspects of vehicle operation based on a behavioral profile.

The vehicle 10, the monitoring system 40 and other vehicle systems include or are connected to an on-board computer system 54 that includes one or more processing devices 56 and a user interface 58. The user interface 58 may include a touchscreen, a speech recognition system and/or various buttons for allowing a user to interact with features of the vehicle. The user interface 58 may be configured to interact with the user via visual communications (e.g., text and/or graphical displays), tactile communications or alerts (e.g., vibration), and/or audible communications.

The monitoring system 40 is configured to collect data related to applied forces, and generate a behavioral profile that spatially represents combined lateral and longitudinal forces on a vehicle. The behavioral profile may be specific to a given vehicle or driver (e.g., represent forces during a given trip or during traversal of a route or trajectory) or may be aggregated among multiple drivers in a given context. In an embodiment, the behavioral profile defines a set of cells or bins arrayed along a longitudinal force axis and a lateral force axis. Each bin is populated with a count or other value representing a frequency at which the vehicle experiences a respective combined force during a trip.

The behavioral profile visually and spatially represents the various forces applied to a vehicle 10 during a trip, and provides patterns indicative of a driver's driving style, as well as vehicle experiences. As the vehicle 10 travels, actions including forward acceleration, braking and turning result in various applied forces and associated inertial effects. These inertial effects and forces impact the in-vehicle experience of drivers and passengers, and also impact the vehicle's condition, such as tire wear, suspension wear, stabilizers and others.

Figure 2:
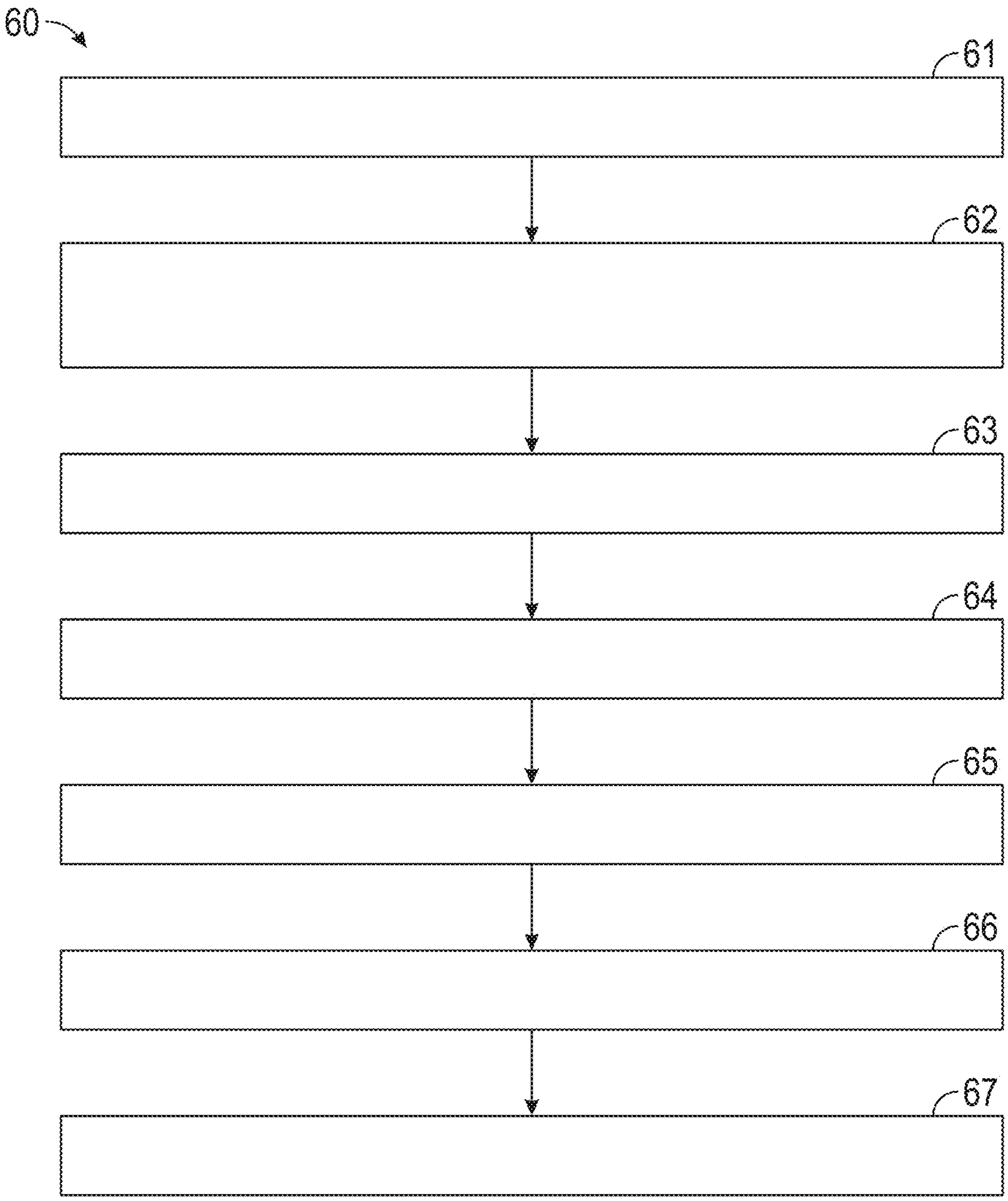
FIG. 2 is a flow diagram depicting aspects of a method of monitoring and evaluating driving behaviors, in accordance with an exemplary embodiment.

FIG. 2 depicts a method 60 of evaluating vehicle operation and driver behaviors. The method 60 is discussed in conjunction with blocks 61-67. The method 60 is not limited to the number or order of steps therein, as some steps represented by blocks 61-67 may be performed in a different order than that described below, or fewer than all of the steps may be performed.

The method 60 is discussed in conjunction with the vehicle of FIG. 1 and a processing system, which may be, for example, the computer system 54, the monitoring system 40, or a combination thereof. Aspects of the method 60 are discussed in conjunction with the vehicle 10 for illustration purposes. It is noted the method 60 is not so limited and may be performed by any suitable processing device or system, or combination of processing devices.

At block 61, the monitoring module 42 collects data and/or measurements that can be used to measure or estimate driver-initiated forces on the vehicle 10. For example, as the vehicle traverses a route or trajectory, vehicle position and heading is monitored (e.g., via GPS). For example, the module 42 collects dense force and/or trajectory data at a plurality of successive time windows (referred to as "sample times") during a selected time period.

The time period is selected based on the context in which the vehicle 10 is being operated. For example, the time period corresponds to the duration of a vehicle "trip", during which the vehicle traverses a desired trajectory (e.g., an intersection, road segment, track, etc.) or route.

Data collection may be performed periodically or continuously (e.g., at each sample time of a sensor). For example, the data is collected repeatedly every 5 minutes (or other time duration or time window). In another example, the data is collected every 3 seconds.

At block 62, the processing module 44, for each time window, calculates a pair of force values (or a plurality of pairs of force values, if multiple vehicles are monitored), including a lateral force component $G_{f,x}$ and a longitudinal force component $G_{f,y}$. As described herein, a "longitudinal" direction or axis is a direction or axis parallel to the heading of the vehicle 10. A longitudinal force may also be referred to as a "headway" force. A "lateral" direction or axis is a direction or axis perpendicular to the longitudinal direction or axis. The lateral direction may be a rightward direction or a leftward direction with respect to the vehicle heading. A lateral force may also be referred to as a "turning force".

The force values may be determined in any suitable manner, such as by direct sensor measurement of forces or accelerations (e.g., longitudinal and lateral acceleration can be directly measured by a sensor such as the IMU 48), by analyzing driver inputs and/or by monitoring position and movement of the vehicle 10. Measured or estimated accelerations may be used as the force values, or the measured or estimated accelerations may be converted to forces (e.g. Newtons or g-forces).

Acceleration or force values can be derived from driver inputs (e.g., driver engagement of the acceleration pedal 46 and/or brakes 48). For example, lateral forces are estimated based on vehicle speed and steering wheel angle, and longitudinal forces are estimated based on a displacement of the acceleration pedal and brakes. In addition, or alternatively, the vehicle velocity and movement can be monitored during the time window (e.g., via camera monitoring, such as a traffic camera, or GPS), and lateral and longitudinal forces are derived based on the velocity and trajectory of the vehicle.

The force values may be expressed as accelerations or forces. In an embodiment, each force value is expressed as a g-force.

At block 63, the lateral and longitudinal force pair (or a combined force value $G_f$ calculated from the pair) is assigned to a bin (e.g., a g-force bin). In an embodiment, each bin represents a feature vector of longitudinal (headway) and lateral acceleration forces. The pair (or combined force value) is assigned to the bin, for example, by adding to the feature vector of the bin.

Figure 3A:
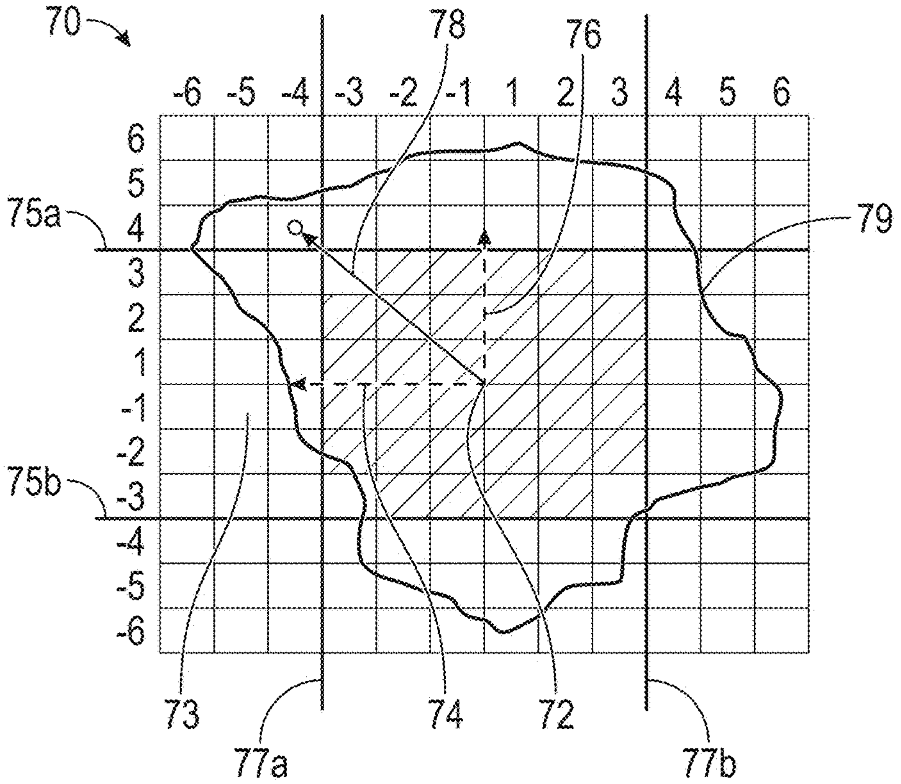
FIGS. 3A and 3B graphically show aspects of applying a force values to a bin or other data structure, in accordance with an exemplary embodiment.
Figure 3B:
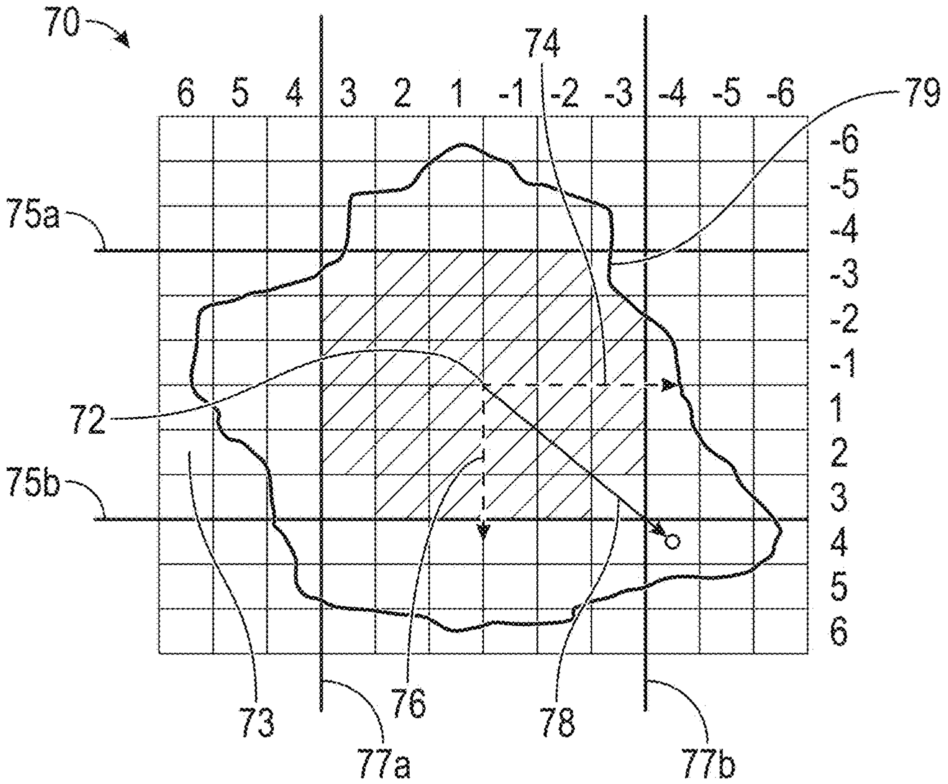

An example of a force pair, and aspects of assigning a combined force pair to a bin, are shown graphically in FIGS. 3A and 3B. FIGS. 3A and 3B show a grid 70 having a center origin 72, and defined by a vertical axis (longitudinal axis) for longitudinal g-forces $G_{f,y}$ and a horizontal axis for lateral forces $G_{f,x}$. In this example, the grid 70 defines a two-dimensional array of cells or bins 73, where each bin 73 has a respective longitudinal force range and a lateral force range.

In an embodiment, the bins 73 are defined by g-forces. For example, the bins 73 represent ranges of g-force values multiplied by 10. Thus, bins in the column labeled "1" have a range of lateral forces between zero and 0.1 g, and bins in the column labeled "−1" have a range of lateral forces between zero and −0.1 g. In this way, all relevant forces are categorized and represented by a consistent and simple convention that allows for ease of analysis and representation.

The grid 70 defines quadrants, including an upper left quadrant that includes positive longitudinal forces (acceleration in a forward direction) and negative lateral forces (leftward forces), and an upper right quadrant that includes positive longitudinal forces and positive lateral forces (rightward forces). A lower left quadrant includes negative longitudinal forces (deceleration or braking forces) and negative lateral forces, and a lower right quadrant includes negative longitudinal forces and positive lateral forces.

The grid 70 also defines bins associated with forces outside of expected or normal ranges, and outside of equilibrium forces. For example, boundaries 75*a* and 75*b* delineate which bins are associated with longitudinal forces that are outside of the normal range (associated with "hard" accelerating or hard braking). Boundaries 77*a* and 77*b* delineate which bins are associated with lateral forces that are outside of the normal range (associated with hard turning).

An example of a pair of collected forces includes a lateral force 74 and a longitudinal force 76, which define a combined force vector 78. The pair of collected forces is assigned to a bin if the combined force vector 78 is within the lateral and longitudinal force magnitudes associated with the bin. If the force vector 78 exceeds the bin structure, the pair is recorded in a nearest valid bin.

The combined force vector 78, as shown, terminates at a bin associated with hard accelerating and hard turning. The force vector 78 may terminate at any point within the bin. As force pairs are collected and assigned to bins, an outline 79 may be generated, which represents the outer boundary of all observed forces. This outline 79 may serve as all or part of a behavioral profile (i.e., in place of or in addition to the patterns and heat maps discussed herein).

A given force pair (or average of force pairs) may terminate at a mid-point of a bin or terminate at another point within the bin 73. As such, the outline 79 need not connect midpoints. For example, the outline 79 follows a pattern of force pairs in each bin 73.

FIG. 3B shows the same grid 70, but with the applied forces transformed into inertial forces that are felt by a driver and/or passenger. The inertial forces have the same magnitude as the applied forces, but with their signs reversed. The behavioral profiles discussed herein may be generated using applied forces or inertial forces.

At block 64, upon completion of the trip, aggregated force measurements or estimations are applied to a two-dimensional data structure, such as a grid similar to or the same as the grid 70 of FIG. 3, where a value representing occurrences of combined forces (i.e., forces having both lateral and longitudinal components) is inserted into each cell of the data structure. The value may be related to the frequency of a given combined force arising, or otherwise be indicative of the occurrence of force pairs having magnitudes within the bounds of the cell. In an embodiment, the data structure is a two-dimensional graph having a longitudinal force axis and a lateral force axis, and includes a two-dimensional array of bins.

In an embodiment, the value assigned to a cell is related to the number of occurrences of combined forces within the range of lateral and longitudinal forces of the cell. For example, each cell is given a bin number indicating the number of instances in which the combined force is within the boundaries of a bin associated with the cell. Other values may be used, such as statistical values or probabilities. For example, a probability may be calculated for a given bin by analyzing the lateral and longitudinal values therein.

Figure 4:
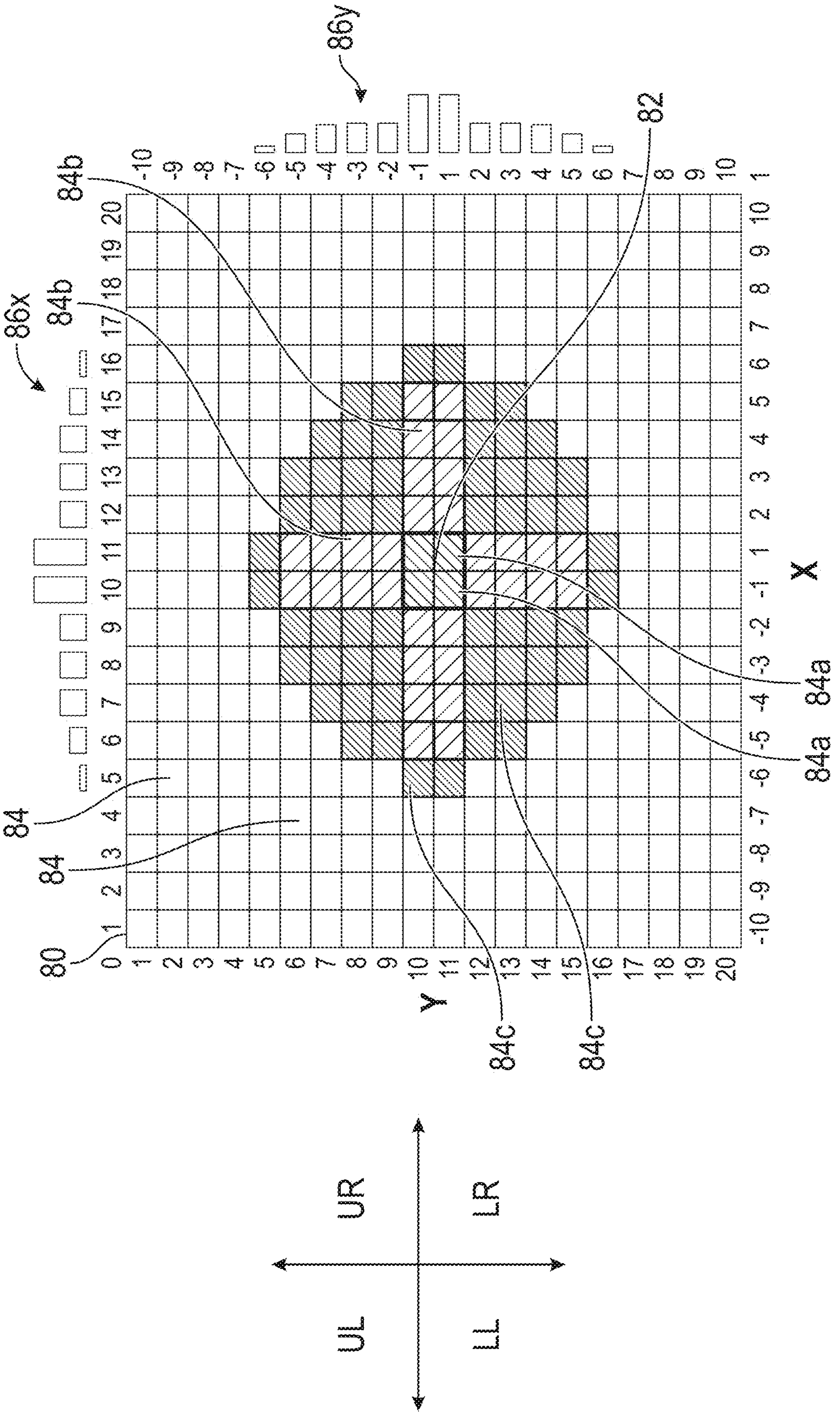
FIG. 4 depicts an example of a two-dimensional grid including cells or other elements populated based on information collected during a vehicle trip, according to the method of FIG. 2.

FIG. 4 shows an example of a grid 80 used to construct a behavioral profile. The grid 80 includes a center origin 82, a vertical axis (Y) for longitudinal force values (or related values, such as probabilities) and a horizontal axis (X) for lateral force values (or related values). The grid 80 defines a plurality of cells 84, where each cell 84 corresponds to a bin having a range of values related to longitudinal forces and a range of values related to lateral forces.

The grid 80 defines four quadrants. An upper right (UR) quadrant includes cells 84 for positive or forward accelerations and forces, and rightward lateral accelerations and forces. An upper left (UL) quadrant includes cells 84 for positive or forward accelerations and forces, and leftward lateral accelerations and forces. A lower right (LR) quadrant includes cells 84 for negative accelerations (decelerations) and forces, and rightward lateral accelerations and forces. A lower left (LL) quadrant includes cells 84 for negative accelerations and forces, and leftward lateral accelerations and forces.

Each cell 84 is populated with a numerical value that represents aggregated lateral and longitudinal forces assigned to the corresponding bin. The numerical value may be a count number, a statistical value, a probability or other related numerical value.

For example, a count summary of all binned forces is acquired and used to populate the cells 84. Each cell 84 may be assigned a count number representing a number of sampled instances in which a lateral and longitudinal force pair had magnitudes within the bounds of the associated bin, or a different value based on the count number (e.g., a probability value).

FIG. 4 also shows bar charts that illustrate the distribution of binned forces, including a bar chart 86*x* that shows the distribution along the X-axis, and a bar chart 86*y* that shows the distribution along the Y-axis. The charts visually demonstrate how normal and expected forces in central cells typically dominate driver experiences.

As shown, the grid may be color coded or shaded according to the populated values. In the example of FIG. 4, the grid 80 is populated with probabilities, where lighter colors or shading indicate higher probabilities and darker colors or shading indicate lower probabilities (unshaded cells are populated with zero). Cells 84*a* are populated with probability values in a first range, cells 84*b* are populated with probability values in a second range that is less than the first range, and cells 84*c* are populated with probability values in a third range that less than the second range. The remaining cells 84 are populated with zero values. Calculation of probability values is discussed further herein in conjunction with FIGS. 8A-8C.

Referring again to FIG. 2, at block 65, normal or equilibrium forces are excluded by discarding bins associated with equilibrium forces and normal forces. An "equilibrium force" is a combined force near the center of the grid, in which the longitudinal and lateral forces are at or near zero. A "normal force" is a force associated with normal or expected levels of acceleration, braking or turning. For example, a normal force is a force less than or equal to 0.2 g force threshold, where "g" is the force of gravity. Any suitable force threshold may be selected, for example, based on road type, vehicle type and/or speed limit.

Figure 5:
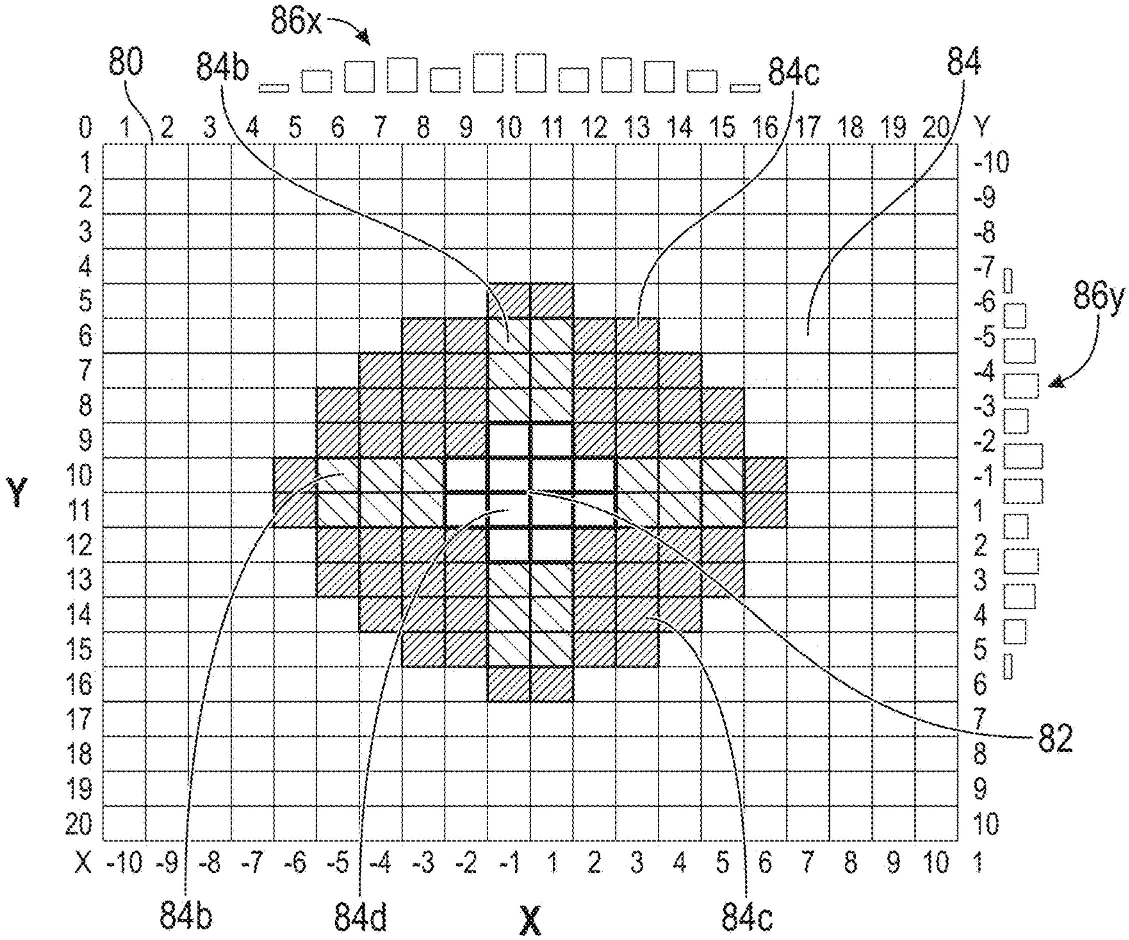
FIG. 5 depicts the two-dimensional grid of FIG. 4, with bins representing equilibrium and normal forces excluded or discarded, according to the method of FIG. 2.

For example, referring to FIG. 5, a mask is applied to discard bins representing equilibrium and normal forces, to generate a behavioral profile. As shown, a subset of the bins 84 (denoted as bins 84*d*) surrounding the origin are set to zero. Removing normal and expected forces changes the distribution as demonstrated by bar charts 86*x* and 86*y*.

Figure 6:
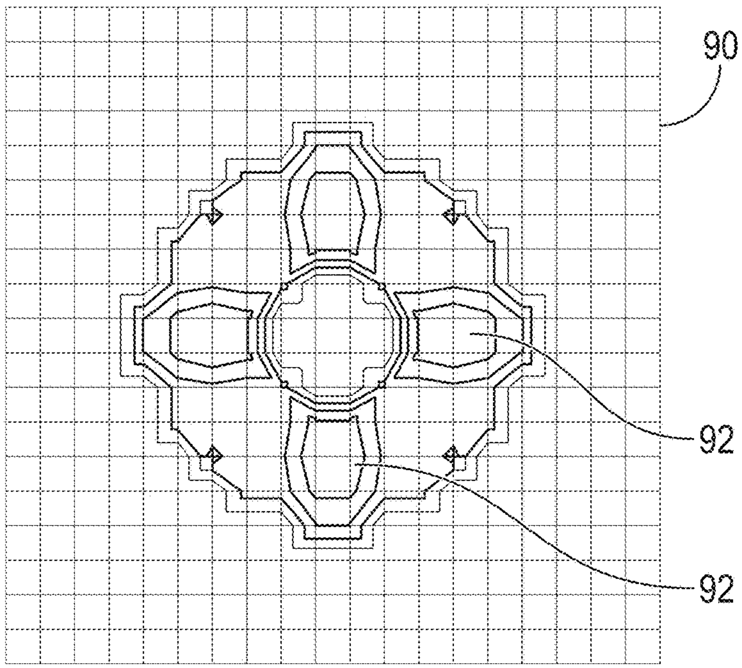
FIG. 6 is an example of a heat map derived from the grid of FIG. 5.

Referring again to FIG. 2, at block 66, the resulting behavioral profile may be further analyzed or processed to enhance and reveal force patterns. For example, as shown in FIG. 6, the behavioral profile 90 is converted to a heat map or other visualization that emphasizes variations in combined forces, shows the dominant force pairs as lobes 92, and clearly reveals a pattern associated with vehicle and driver behavior during the trip.

At block 67, one or more actions may be performed using the behavioral profile. A behavioral profile may be used to classify or characterize a driver style, which can be used for driver risk assessment, maintenance scheduling, vehicle wear and tear prediction, diagnosis of vehicle problems, and others. Machine learning (e.g., unsupervised learning) may be used for recognizing and classifying driving styles.

In an example, the vehicle 10 includes autonomous or semi-autonomous control capability, and may control aspects of vehicle operation based on the behavioral profile. For example, driver profiles and recent driver experiences traversing a road segment can be made available to autonomous vehicles to hedge drive choices and minimize adversarial engagements with other vehicles.

In another example, suggestions may be presented to a driver based on the behavioral profile. The suggestions may include changes in the driver's style (e.g., reduce hard braking) that may improve the driver experience, or increase the useful life of vehicle components and systems.

Other actions may include evaluating a condition of the vehicle based on the behavioral profile, transmitting information to a dealer or technician, and others.

A behavioral profile may be generated at a vehicle level, so as to characterize behavior of a given vehicle in a variety of trip types, road networks, and traffic environment. The behavioral profile may be generated at a fleet level, to characterize a group of vehicles. For example, vehicle traces from multiple vehicles traversing a road segment or roadway can be collected and aggregated, and a behavioral profile is generated that reveals patterns across multiple vehicles while traversing the common road segment or roadway.

Lateral and/or longitudinal forces may be directly measured, or inferred or estimated based on other data. In an embodiment, lateral and/or longitudinal forces are estimated based on monitoring position information, such as vehicle location, velocity, heading and/or trajectory.

Lateral forces deal with turning and road curvature driving behaviors that exert leftward and rightward forces on the vehicle. Calculation of lateral forces may be based on changes in vehicle heading along with observed velocities over a given time window (e.g., 3-second interval). The calculation provides estimated lateral g-forces given heading changes and velocity changes.

In an embodiment, longitudinal and/or lateral forces are inferred based on monitoring the speed and location of the vehicle. For example, for each instance of a force pair collection, the velocity of the vehicle is sampled over a selected time window and a change in the velocity over that time window may be used to calculate the acceleration/deceleration and associated acceleration force or braking force (or lateral change in velocity and associated lateral force or turning force).

In some cases, the average velocity change over a time window is sufficient to capture the likely behavior of a vehicle (e.g., in sparse traffic conditions). However, in other cases, dynamic factors affect the how the vehicle is controlled; thus, the rate of velocity change is not constant. For example, if a maneuver occurs in dense traffic, the presence of other vehicles are likely to affect adjustments in speed and spacing.

Thus, in an embodiment, the longitudinal velocity change is simulated by weighting different sections of the time window. This may be accomplished by dividing a time window into successive sections, and applying a weight value to each section to capture variations in the change of velocity.

In the following example, a velocity of a vehicle is captured over 3 second time windows. Although the example is discussed in conjunction with longitudinal acceleration and longitudinal forces, lateral acceleration and lateral forces may be similarly estimated.

The average change in velocity may simply be a difference in the captured velocity between a current time window and an immediately preceding time window. Alternatively, sections of the time window may be weighted to reflect variations in the velocity change.

Various weighting patterns may be selected to capture driver behavior patterns in various contexts, and determine the probability of hard braking and acceleration.

The following table ("Table 1") illustrates how a weighting scheme including different weights over each of a plurality of 3-second measurement windows can be used to summarize possible g-forces within observed averages. Column "|dv|dt" is the observed longitudinal velocity change given the measurement window, which is then rendered as a per second velocity change in the column "|dv/dt|". The longitudinal velocity change is then transformed into a g-force average in column "gF". The last 3 columns adjust the weights of how much braking or acceleration activity occurred in each time window. In this example, a weight value is assigned to 1-second intervals of the time window. "$w_0$" is a weight assigned to the first interval, "$w_1$" is a weight assigned to the next interval, and "$w_2$" is a weight assigned to the last interval. In this example, the weights for $w_0$, $w_1$ and $w_2$, are 0.15, 0.15 and 2.70 respectively, reflecting a lighter pedal touch being applied before a more aggressive change to create the observed average. Given the weight profile defined by weights $w_1$, $w_2$ and $w_3$, Table 1 illustrates possible g-forces experienced during the measurement window

TABLE 1

| | | | gF per second | | |
|---|---|---|---|---|---|
| $\lvert dv \rvert_{dt=3}$ | $\lvert dv/dt \rvert$ | gF | $w_0 = 0.15$ | $w_1 = 0.15$ | $w_2 = 2.7$ |
| 0 | 0 | 0.00 | 0.00 | 0.00 | 0.00 |
| 3 | 1 | 0.03 | 0.00 | 0.00 | 0.08 |
| 6 | 2 | 0.06 | 0.01 | 0.01 | 0.15 |
| 9 | 3 | 0.09 | 0.01 | 0.01 | 0.23 |
| 12 | 4 | 0.11 | 0.02 | 0.02 | 0.31 |
| 15 | 5 | 0.14 | 0.02 | 0.02 | 0.38 |
| 18 | 6 | 0.17 | 0.03 | 0.03 | 0.46 |
| 21 | 7 | 0.20 | 0.03 | 0.03 | 0.54 |
| 24 | 8 | 0.23 | 0.03 | 0.03 | 0.61 |
| 27 | 9 | 0.26 | 0.04 | 0.04 | 0.69 |
| 30 | | 0.28 | 0.04 | 0.04 | 0.77 |

Table 1 shows that average velocity changes of 4 kph or more over a 3-second interval result in g-forces greater than 0.3 g, and thus can be considered to correspond to hard acceleration or braking.

In an embodiment, simulations of longitudinal and/or lateral forces and corresponding inertial forces are performed under different weighting schemes and different average velocity changes. Such simulations can be used to estimate longitudinal and/or lateral force for a vehicle based on the vehicle's detected average velocity. In addition, such simulations can be used to determine the likelihood of hard turning, hard braking and/or hard acceleration occurring at a given time window (e.g., at a given 3-second window or an interval within the time window).

Figure 7:
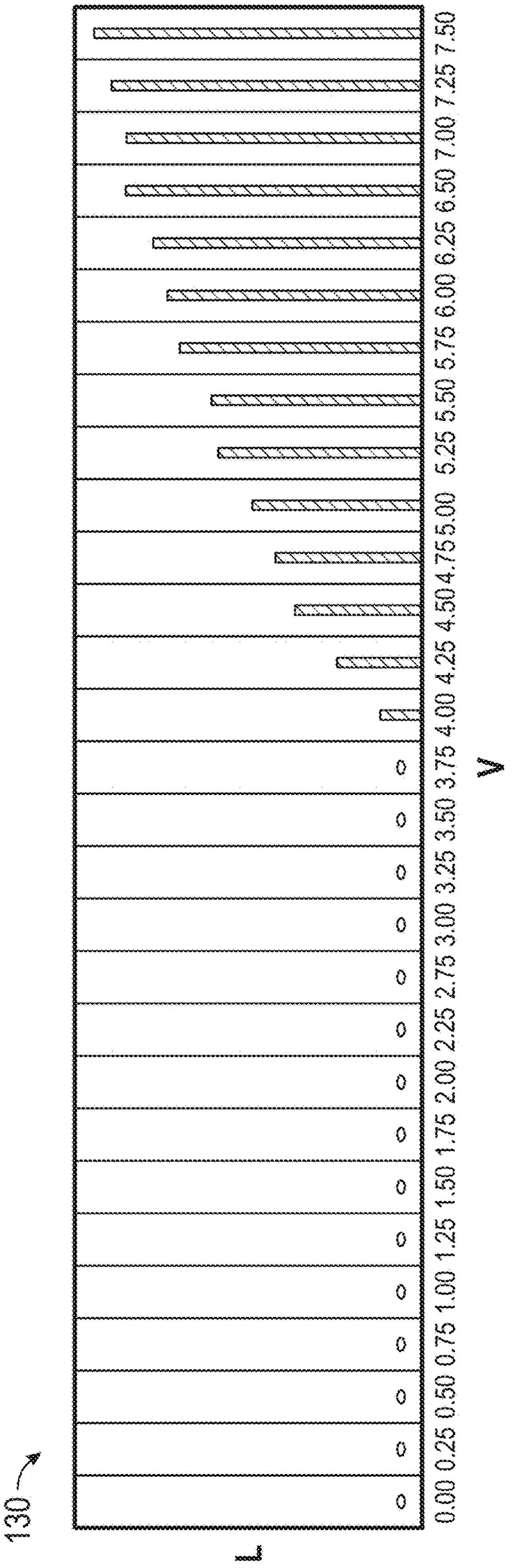
FIG. 7 depicts a bar graph showing a likelihood of harsh braking or acceleration resulting from simulations of longitudinal accelerations, in accordance with an exemplary embodiment.

FIG. 7 depicts a bar graph 130 that summarizes the likelihood of braking or acceleration events exceeding 0.3 g under a plurality of different weighting schemes. The horizontal axis represents average velocity change (V) in kilometers-per-hour-per second (kph/s) during a 3-second time window, and each bar has a vertical extent that indicates a likelihood (L) that the g-force experienced will be greater than 0.3 g. As shown, the likelihood increases substantially as average velocities exceed about 4 kph.

Figure 8A:
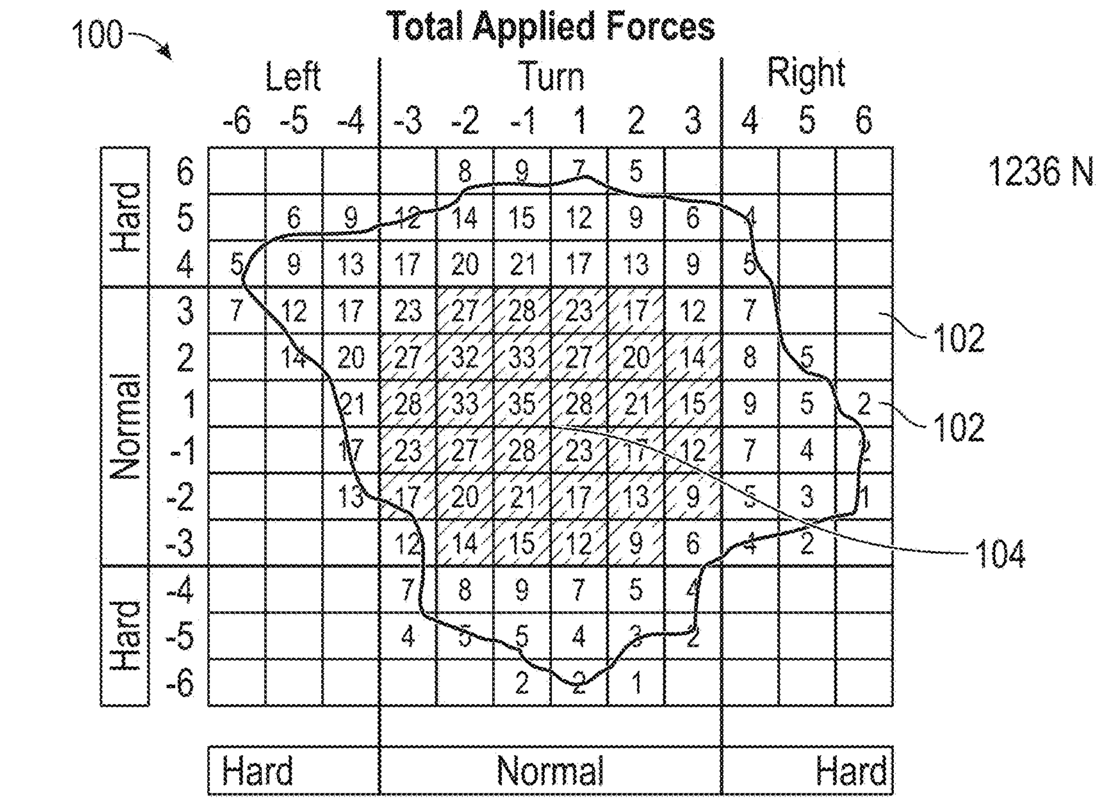
FIGS. 8A-8C depict an example of generating or constructing a behavioral profile based on the grid of FIG. 4, and according to the method of FIG. 2.
Figure 8B:
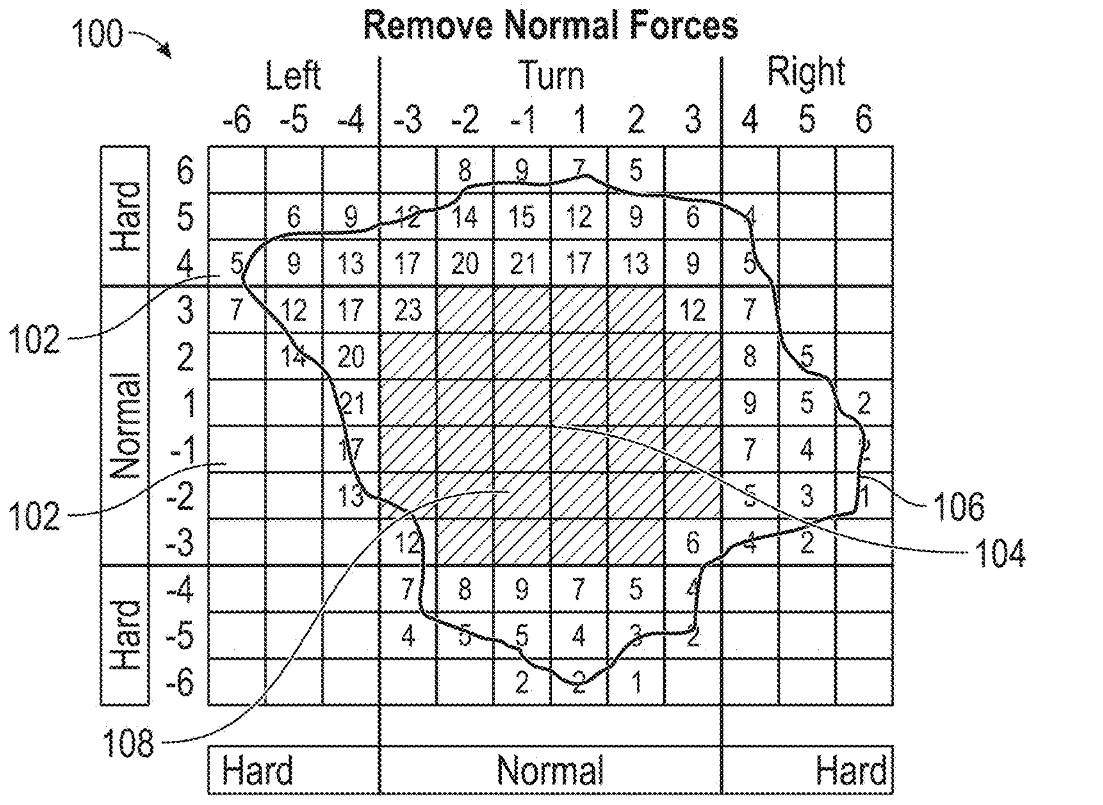
Figure 8C:
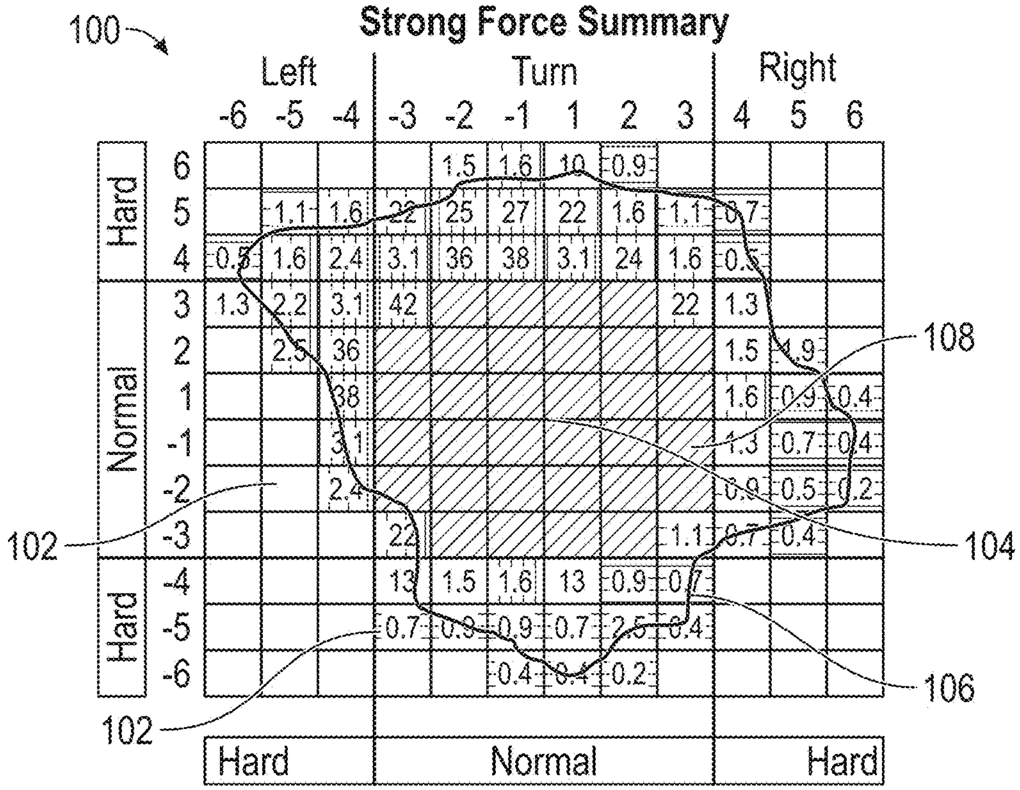

FIGS. 8A-8C depict an example of generating a behavioral profile indicating total applied forces. FIG. 8A shows an example of a grid 100 used to generate the profile, including a 2D array of cells 102 and an origin 104. Each cell 102 is associated with a respective bin, and is populated with an integer count number (or value related to the count number).

Longitudinal force bins are defined in terms of velocity change per window, where each row represents a velocity change of one kph/s. Thus, row "1" represents longitudinal velocity change ranging from zero to one kph/s, and row "−1" represents longitudinal velocity change (deceleration) ranging from zero to −1 kph/s. Row "2" represents longitudinal velocity change from one to two kph/s, and row "−2" represents longitudinal velocity change from −1 to −2 kph/s.

Lateral force bins are defined in terms of g-forces multiplied by ten. Thus, column "1" represents lateral (rightward) g-forces ranging from zero to 0.1 g, and column "−1" represents lateral (leftward) g-forces ranging from zero −0.1 g. Column "2" represents lateral g-forces from 0.1 to 0.2 g, and column "−2" represents lateral g-forces from −0.1 and −2 kph/s.

An intersection was monitored for one day, and data was collected for each vehicle that traverse the intersection (referred to as "vehicle traces"), including turns and pedal forces (accelerator and brakes). Conditions associated with the intersection were also recorded, including time, date, weather conditions, road surface conditions, and others.

As each vehicle traversed the intersection, lateral force and longitudinal force were measured (or determined based on GPS data) and a set (i.e., one or more) of force pairs was determined. Each force pair includes a lateral force value and a longitudinal force value.

In this example, longitudinal forces were estimated based on vehicle position and velocity changes (kph/s) in successive 3-second windows. Lateral forces were calculated from telemetry data, resulting in measured g-forces. Measured g-forces were then multiplied by ten to conform to the cell ranges and align with the velocity change bins of kph per second.

In this example, an average change in velocity of 4 kph over a 3-second window is selected as being indicative of hard braking or acceleration. An average of at least 4 kph per second over 3 seconds reflects a vehicle velocity change of 12 kph and is sufficient to affect the decisions of other drivers in a traffic stream.

In this example, hard braking corresponds to recorded speed decreases that are at least 4 kilometers per hour per second across all vehicles measured. While a hard braking maneuver in and of itself is not dangerous, larger collections of hard braking mean that crash risk is higher due to driver proximity and reaction time to other vehicles.

Hard acceleration corresponds to recorded speed increases that are at least 4 kilometers per hour per second across all vehicles measured. While hard braking is often a reactive maneuver, hard acceleration is many times an aggressive driver choice that can increase tension and churn in a traffic stream.

Hard braking or acceleration can be defined as changes in velocity, or defined in terms of g-forces. In this example, hard braking and acceleration are defined as a per-second velocity change that generates 0.3 g-forces which is $|dv/dt|>\sim 11$ kph.

Also in this example, harsh turning is defined as turning that causes g-forces greater than 0.39 g. Thus, lateral g-forces between 0 and 0.39 g are considered normal and may be excluded via masking.

Force boundaries are shown that illustrate bins associated with hard acceleration and hard turning. In this example, lateral forces above 0.4 g (in bins 4 or higher) or below −0.4 g (in bins −4 or lower) are associated with harsh turning. Longitudinal forces above 0.3 g (in bins 4 or higher) or below −0.3 g (in bins −4 or lower) are associated with higher likelihood of harsh acceleration and braking.

As shown in FIG. 8A, each cell 102 was populated with a count number that represents the number of force pairs assigned thereto. A count summary was generated, include a count number for each cell 102, and used to populate the grid 100.

As shown in FIG. 8B, a transition mask is applied to set selected cells 102 of the grid 100 to zero, to remove normal forces. The transition mask sets a group of cells 108 around the origin to zero, and thereby excludes bins considered to represent equilibrium and normal forces. At this point, the pattern of count numbers (and/or the associated outline 106) can be used as the behavioral profile.

Referring to FIG. 8C, a probability value is calculated for each bin (and inserted into an associated cell 102) based on the aggregated lateral and longitudinal force values in each bin, to generate a strong force summary. A total bin count is calculated by summing all of the count numbers in the grid 100. Each cell 102 is assigned a probability value, which is equal to the count number in the cell 102, divided by the total count number (551 in this example) and multiplied by 100 to derive a percentage.

The behavioral profile of FIGS. 8B and/or 8C can be converted to any other visual display or format that can be used to visualize the patterns revealed by the behavioral profile. For example, the behavioral profile is used to generate a visualization that conveys aspects of a driver's driving pattern.

Figure 9:
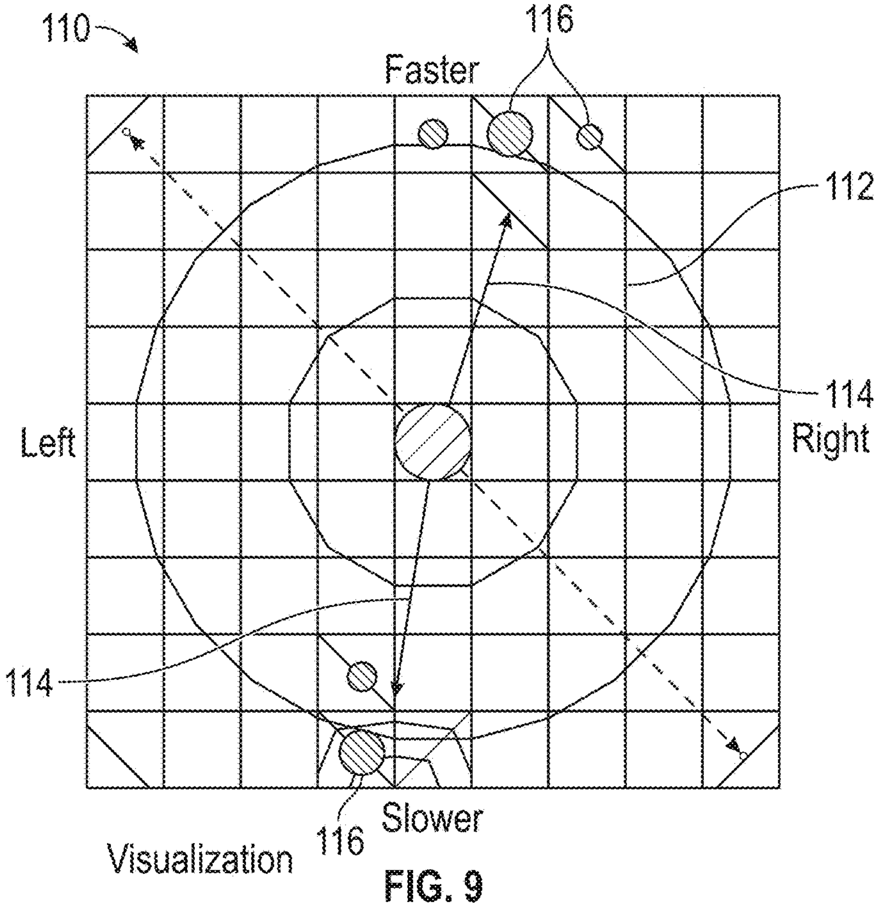
FIG. 9 depicts an example of a visualization generated based on the behavioral profile associated with an intersection.

FIG. 9 shows an example of a visualization 110, in the form of a graphical display. The visualization 110 includes gridlines 112 that correspond to cells of a behavioral profile. In addition, the pattern revealed by the behavioral profile is illustrated by a set of arrows 114 pointing toward the spatial location of cells having the highest probabilities. In addition, circles 116 are displayed for the cells having the highest probabilities, with the size of each circle 116 corresponding to the probability.

Figure 10:
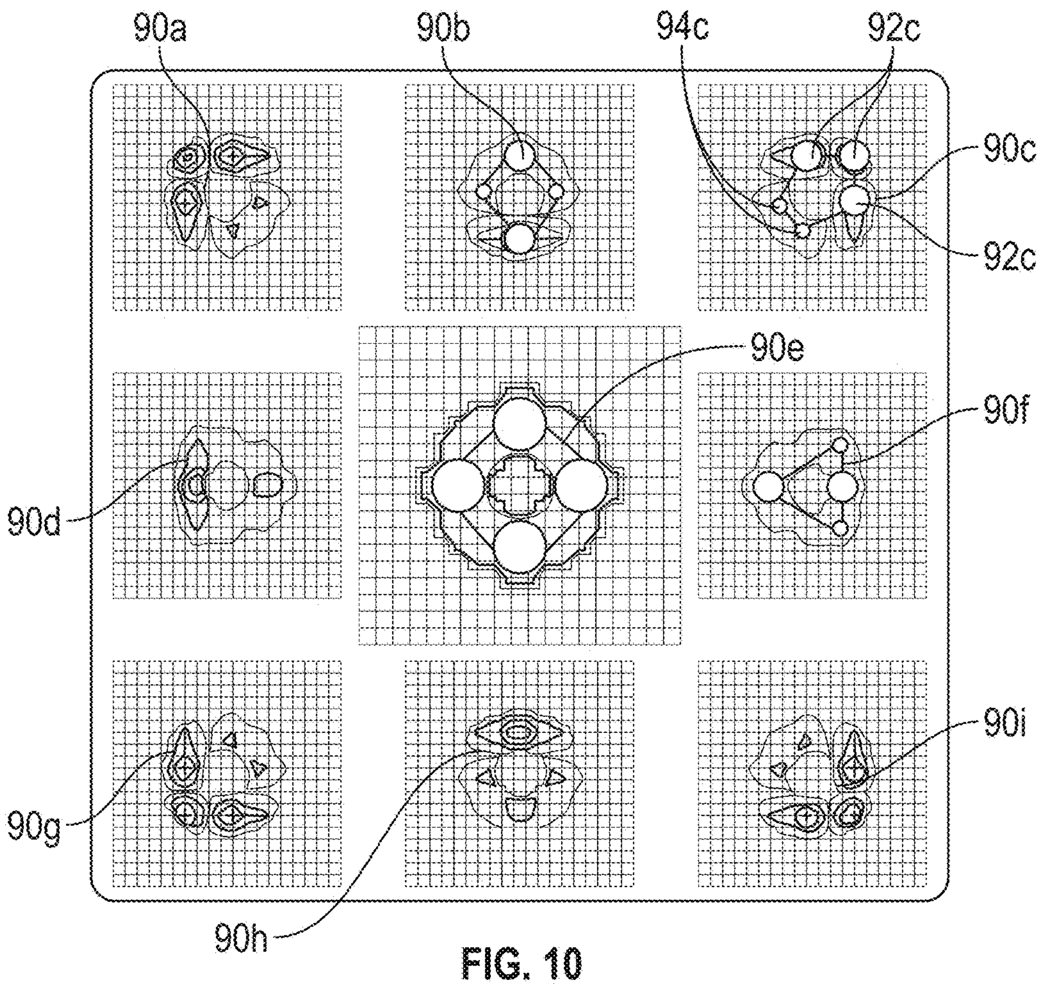
FIG. 10 depicts examples of behavioral profiles.

FIG. 10 depicts examples of the behavioral profile 90, denoted as behavioral profiles 90*a*-90*i*. Each profile represents a pattern of applied forces that correspond to the number of times or probability of an applied force having a given magnitude and direction. Each profile represents an aggregation of forces applied over a given time period and in a given environment, for a single vehicle or for multiple vehicle s (e.g., a fleet).

For example, the profile 90*c* shows a pattern having regions 92*c* that represent high accelerations (i.e. greater than equilibrium and normal forces) in forward and right lateral directions, and regions 94*c* that represent high acceleration (deceleration or braking forces) in the reverse and left directions. As shown, the pattern is dominated by high rightward accelerations.

Behavioral profiles may be analyzed, for example, to identify common driving styles. In an embodiment, a machine learning algorithm, such as unsupervised learning, is used to identify common driving profiles.

Behavioral profiles may be used for various purposes, such as fleet management, vehicle control adjustments, suggestions for changes in driving style, recommendations for maintenance and repair, and others. For example, a profile 90 may represent an individual driver's driving style, which can be used to recommend changes in the driver's style for purposes such as improving mileage or range and providing a customized maintenance schedule.

Analysis of behavioral profiles, such as by supervised learning, may be performed to predict and forecast vehicle wear and tear based on driving behaviors and/or vehicle environments. A machine learning system can be used to associate behavioral profiles with specific maintenance needs. For example, if a behavioral profile for a vehicle indicates a tendency to brake harshly, a maintenance schedule is determined that recommends brake inspections after a shorter time period than is typical for the vehicle's type and age.

In another example, behavioral profiles can be analyzed to identify crash or accident risks, using supervised learning or other suitable algorithm or process. A behavioral profile may be associated with risks of certain types of accidents, such as rear or front collisions.

Figure 11:
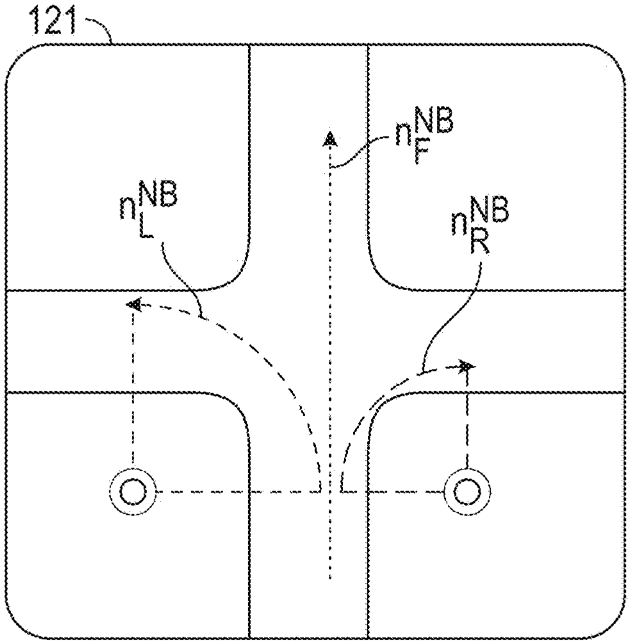
FIG. 11 schematically illustrates an intersection.
Figure 12:
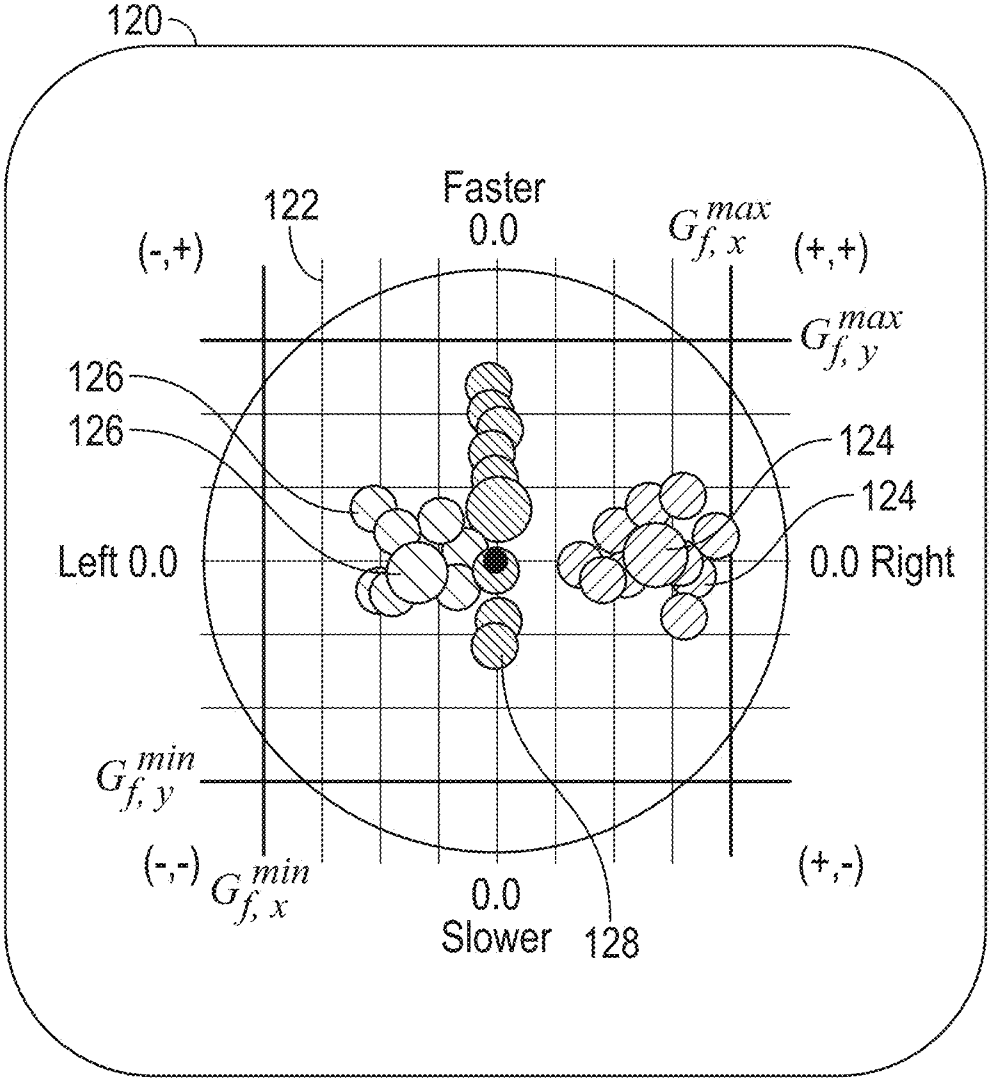
FIG. 12 depicts an example of a behavioral profile generated for the intersection of FIG. 11.

FIG. 11 schematically depicts an intersection 121, and FIG. 12 depicts a behavioral profile associated with the intersection 121. In this example, the behavioral profile is constructed for northbound vehicles, initially traveling in a forward direction as denoted by line $n_F^{NB}$. Right turns are represented by a curve $n_R^{NB}$, and left turns are represented by a curve $n_L^{NB}$.

A behavioral profile 120 generated for the intersection 121 is shown in FIG. 12 in a grid 122. Location and heading information was collected for vehicles traveling the intersection 121 over a time period, and the behavioral profile 120 represents the aggregated behaviors of the vehicles. The grid 122 defines four quadrants as discussed herein. The behavioral profile 120 is a heat map that shows the instances of normal and hard right turns (bubbles 124), normal and harsh left turns (bubbles 126) and normal and hard forward accelerations and braking (bubbles 128).

Figure 13:
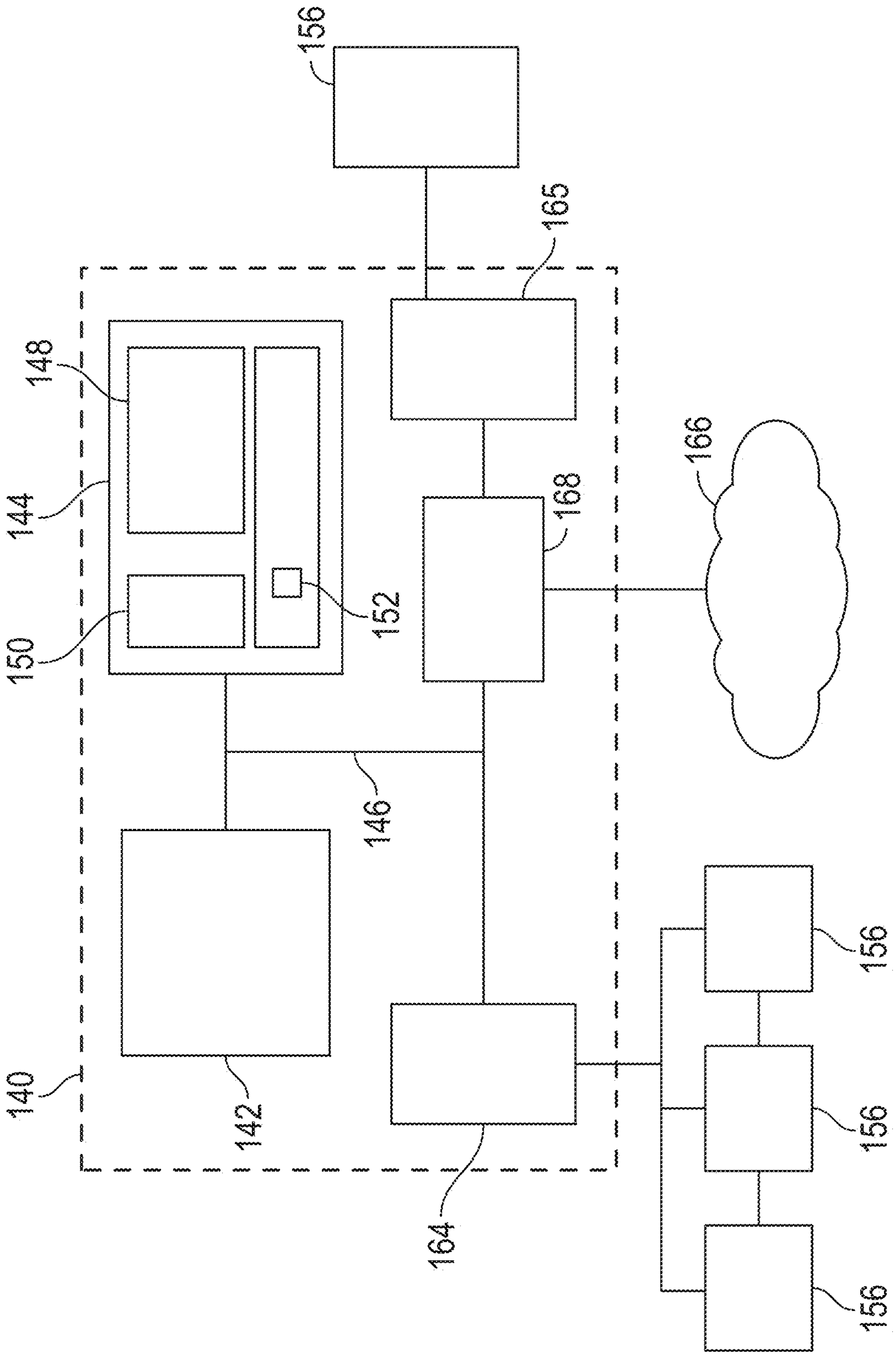
FIG. 13 depicts a computer system in accordance with an exemplary embodiment.

FIG. 13 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module or modules 152 may be included to perform functions discussed herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 140. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for evaluating a vehicle, comprising:

at least one processor including:

a monitoring module configured to acquire information related to a combined force applied to the vehicle at each of a plurality of successive sample times during a selected time window, the combined force applied to the vehicle based on driver control of the vehicle, the combined force including a longitudinal force and a lateral force; and an analysis module configured to receive the acquired information and determine a plurality of force pairs based on the acquired information, each force pair of the plurality of force pairs including a longitudinal force value and a lateral force value, the analysis module configured to:

assign each force pair to one of a plurality of bins, each bin of the plurality of bins associated with a respective longitudinal force range and a respective lateral force range; and construct a two-dimensional behavioral profile that spatially represents the combined forces and presents a pattern of behavior during the selected time window, the two-dimensional behavioral profile including a two-dimensional array of data elements, each data element of the two-dimensional array of data elements corresponding to a respective bin, wherein the two-dimensional array of data elements is a two-dimensional grid having a first axis representing longitudinal force values and a second axis representing lateral force values, the two-dimensional behavioral profile is constructed by populating each data element based on one or more force pairs assigned to the respective bin, and constructing the behavioral profile includes:

identifying a group of populated data elements, each of the group of populated data elements having a non-zero value;

identifying a subset of the group of populated data elements, each populated data element of the subset being a peripheral data element located at a periphery of the group of populated data elements; and defining an outer boundary of observed forces, the outer boundary intersecting each peripheral data element, wherein the outer boundary intersects a peripheral data element according to a pattern of a set of force pairs assigned to a bin corresponding to the peripheral data element.

2. The system of claim 1, further comprising a control module configured to perform at least one of:

controlling an aspect of vehicle operation based on the two-dimensional behavioral profile;

presenting a suggestion to a driver of the vehicle based on the two-dimensional behavioral profile;

determining a driving style of the driver based on the two-dimensional behavioral profile acceleration; and evaluating a condition of the vehicle based on the two-dimensional behavioral profile.

3. The system of claim 1, wherein the monitoring module is configured to collect, for each sample time window, a vehicle position, a vehicle heading, a longitudinal acceleration and a lateral acceleration of the vehicle.

4. The system of claim 3, wherein at least one of the longitudinal acceleration and the lateral acceleration is determined based on the vehicle position, a vehicle velocity and a trajectory of the vehicle.

5. The system of claim 1, wherein the two-dimensional grid includes a plurality of cells and is divided into a set of quadrants.

6. The system of claim 5, wherein the set of quadrants include an upper left quadrant representing forward acceleration and leftward acceleration, an upper right quadrant representing forward acceleration and rightward acceleration, a lower left quadrant representing longitudinal deceleration and leftward acceleration, and a lower right quadrant representing longitudinal deceleration and rightward acceleration.

7. The system of claim 5, wherein each bin is a feature vector, and the analysis module is configured to, for each force pair, determine a combined force vector based on the longitudinal force value and the lateral force value, and assign the combined force vector to the respective bin.

8. The system of claim 1, wherein a data element is populated with a value based on a bin count for an associated bin, the bin count representing a number of force pairs assigned to the associated bin.

9. The system of claim 8, wherein the data element is populated by a probability value, the probability value based on the bin count for the associated bin and a total bin count, the total bin count being a sum of bin counts in the two-dimensional array of data elements.

10. A method of evaluating a vehicle, comprising:

acquiring information related to a combined force applied to the vehicle at each of a plurality of successive sample times during a selected time window, the combined force applied to the vehicle based on driver control of the vehicle, the combined force including a longitudinal force and a lateral force;

determining a plurality of force pairs based on the acquired information, each force pair of the plurality of force pairs including a longitudinal force value and a lateral force value;

assigning each force pair to one of a plurality of bins, each bin of the plurality of bins associated with a respective longitudinal force range and lateral force range; and constructing a two-dimensional behavioral profile that spatially represents the combined forces and presents a pattern of driver behavior during the selected time window, the two-dimensional behavioral profile including a two-dimensional array of data elements, each data element of the two-dimensional array of data elements corresponding to a respective bin, wherein the two-dimensional array of data elements is a two-dimensional grid having a first axis representing longitudinal force values and a second axis representing lateral force values, the two-dimensional behavioral profile is constructed by populating each data element based on one or more force pairs assigned to the respective bin, and constructing the behavioral profile includes:

identifying a group of populated data elements, each of the group of populated data elements having a non-zero value;

identifying a subset of the group of populated data elements, each populated data element of the subset being a peripheral data element located at a periphery of the group of populated data elements; and defining an outer boundary of observed forces, the outer boundary intersecting each peripheral data element, wherein the outer boundary intersects a peripheral data element according to a pattern of a set of force pairs assigned to a bin corresponding to the peripheral data element.

11. The method of claim 10, wherein acquiring the information includes collecting, for each sample time window, a vehicle position, a vehicle heading, a longitudinal acceleration and a lateral acceleration of the vehicle.

12. The method of claim 11, wherein at least one of the longitudinal acceleration and the lateral acceleration is determined based on the vehicle position, a vehicle velocity and a trajectory of the vehicle.

13. The method of claim 10, wherein the two-dimensional grid includes a plurality of cells and is divided into a set of quadrants.

14. The method of claim 10, wherein each bin is a feature vector, and assigning a force pair includes determining a combined force vector based on a longitudinal force value and a lateral force value, and assigning the combined force vector to the respective bin.

15. The method of claim 13, wherein a data element is populated with a value corresponding to a bin count for an associated bin, the bin count representing a number of force pairs assigned to the associated bin, and constructing the two-dimensional behavioral profile includes excluding cells in a center region of the grid to generate a final behavioral profile.

16. A vehicle system comprising:

a memory having computer readable instructions; and a processing device for executing the computer readable instructions, the computer readable instructions controlling the processing device to perform a method comprising:

acquiring information related to a combined force applied to a vehicle at each of a plurality of successive sample times during a selected time window, the combined force applied to the vehicle based on driver control of the vehicle, the combined force including a longitudinal force and a lateral force;

determining a plurality of force pairs based on the acquired information, each force pair of the plurality of force pairs including a longitudinal force value and a lateral force value;

assigning each force pair to one of a plurality of bins, each bin of the plurality of bins associated with a respective longitudinal force range and lateral force range; and constructing a two-dimensional behavioral profile that spatially represents the combined forces and presents a pattern of driver behavior during the selected time window, the two-dimensional behavioral profile including a two-dimensional array of data elements, each data element of the two-dimensional array of data elements corresponding to a respective bin, wherein the two-dimensional array of data elements is a two-dimensional grid having a first axis representing longitudinal force values and a second axis representing lateral force values, the two-dimensional behavioral profile is constructed by populating each data element based on one or more force pairs assigned to the respective bin, and constructing the behavioral profile includes:

identifying a group of populated data elements, each of the group of populated data elements having a non-zero value;

identifying a subset of the group of populated data elements, each populated data element of the subset being a peripheral data element located at a periphery of the group of populated data elements; and defining an outer boundary of observed forces, the outer boundary intersecting each peripheral data element, wherein the outer boundary intersects a peripheral data element according to a pattern of a set of force pairs assigned to a bin corresponding to the peripheral data element.

17. The vehicle system of claim 16, wherein acquiring the information includes collecting, for each sample time window, a vehicle position, a vehicle heading, a longitudinal acceleration and a lateral acceleration of the vehicle.

18. The vehicle system of claim 17, wherein at least one of the longitudinal acceleration and the lateral acceleration is determined based on the vehicle position, a vehicle velocity and a trajectory of the vehicle.

19. The vehicle system of claim 16, wherein each bin is a feature vector, and assigning a force pair includes determining a combined force vector based on a longitudinal force value and a lateral force value, and assigning the combined force vector to a bin.

20. The vehicle system of claim 16, wherein a data element is populated with a value corresponding to a bin count for an associated bin, the bin count representing a number of force pairs assigned to the associated bin, and constructing the two-dimensional behavioral profile includes excluding a set of data elements in a center region of the two-dimensional array to generate a final behavioral profile.

* * * * *